Feb. 14, 1950    H. J. BUTLER    2,497,438
FLUID OPERATED DISK BRAKE

Filed Oct. 3, 1947    2 Sheets-Sheet 1

Inventor
Henry James Butler
by Benj. T. Rauber
his attorney

Feb. 14, 1950     H. J. BUTLER     2,497,438
FLUID OPERATED DISK BRAKE
Filed Oct. 3, 1947     2 Sheets-Sheet 2
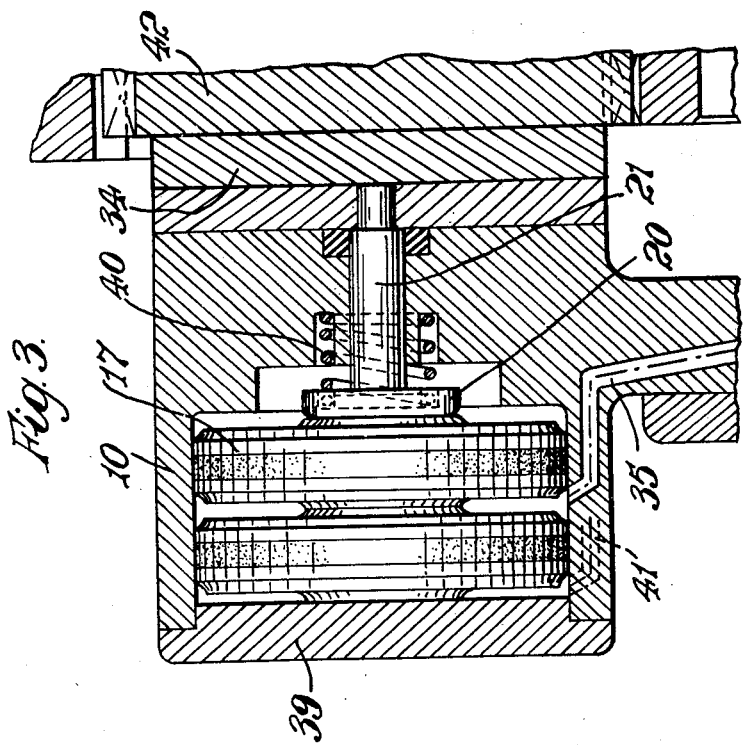
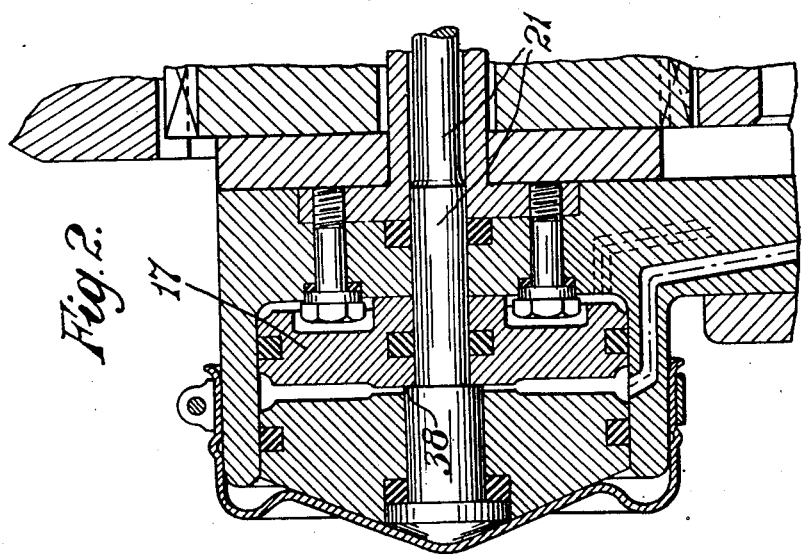
Inventor
Henry James Butler
by Benj. T. Rauber
his attorney Patented Feb. 14, 1950

2,497,438

UNITED STATES PATENT OFFICE 2,497,438

FLUID OPERATED DISK BRAKE

Henry James Butler, Sutton Coldfield, England, assignor to Dunlop Rubber Company Limited, London, England, a British company Application October 3, 1947, Serial No. 777,698
In Great Britain October 1, 1946

Section 1, Public Law 690, August 8, 1946
Patent expires October 1, 1966

8 Claims. (Cl. 188—152)

1

My invention relates to fluid operated disc brakes with special reference to brakes for the landing wheels of aircraft.

It is the object of this invention to provide fluid operated disc brakes having an emergency system of fluid supply said brakes being operative by dual control so that should one system fail for any reason, the alternative system is immediately available with a minimum increase in the weight of the braking elements.

According to this invention a fluid operated disc brake adapted for duel control comprises a brake operating cylinder, two pistons therein, and two systems of fluid supply for the application of braking pressure, the ports to the cylinder for the fluid supply being so placed that the pistons tend to move in the same direction on the application of braking pressure from one system of fluid supply and to move in opposite directions on the application of braking pressure from the other system of fluid supply. Preferably the brake has a pair of concentric annular disc elements radially spaced apart and friction elements to co-operate with the said discs, as described in application Ser. No. 697,014 filed September 14, 1946 and comprises two pistons having a common rod which passes between the two discs and is moveable in tension by each piston to operate the friction elements with the disc elements.

The invention will now be more particularly described with reference to the accompanying drawings in which similar reference numerals denote corresponding parts throughout the several views.

Figs. 2 and 3 illustrate modified forms of fluid operated disc brakes.

Figure 1:
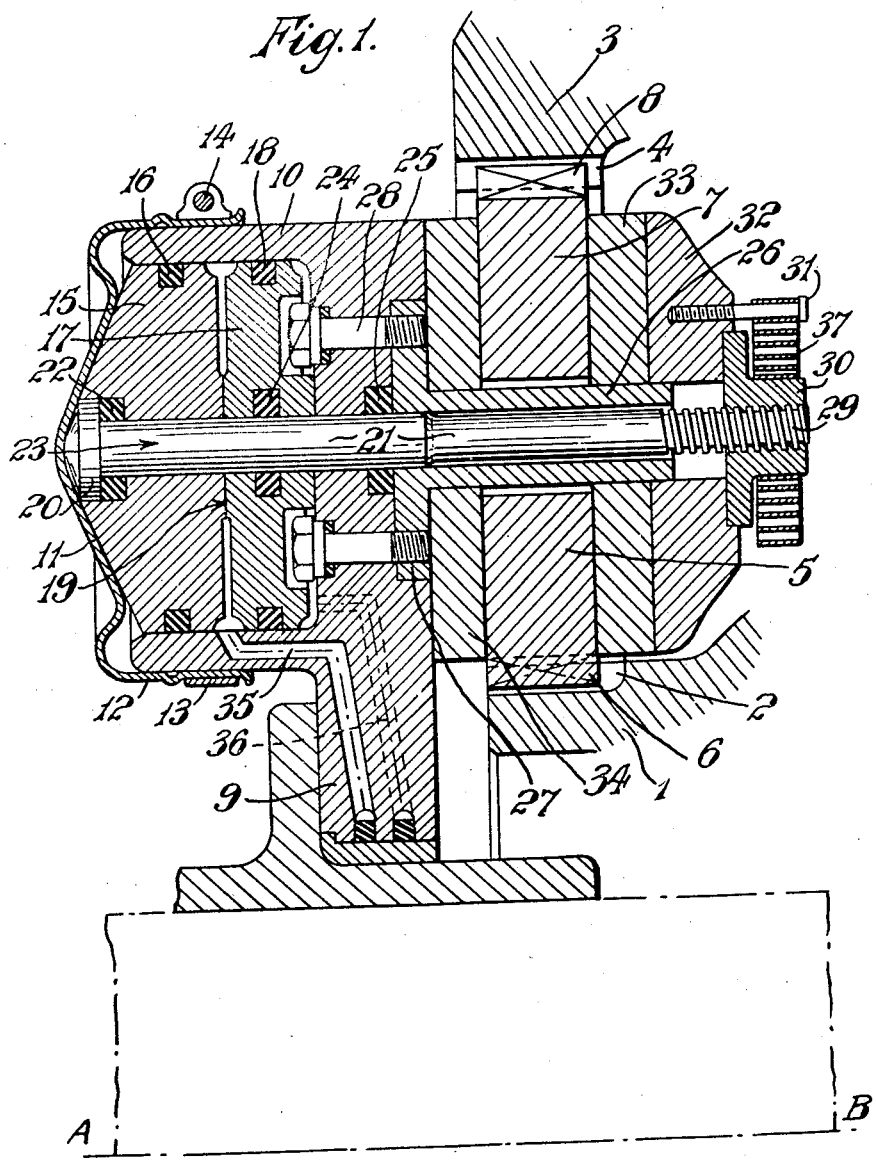
Fig. 1 is a longitudinal sectional view of a fragmentary part of a fluid operated disc brake.

Referring to Fig. 1 the axis of the wheel is indicated at A—B and the hub 1 of said wheel is formed with dog teeth 2 whilst the rim 3 or a part attached thereto is formed with dog teeth 4. An inner annular disc 5 concentric about the axis A—B is provided in its bore with dog teeth 6 which interengage with the dog teeth 2 in a manner allowing the disc 5 to slide axially relatively to the hub 1. An outer annular disc 7 concentric with the disc 5 is provided on its periphery with dog teeth 8 which interengage with the dog teeth 4 in a manner allowing the disc 7 to slide axially relatively to the part 3.

A plate 9 is mounted in a non-rotatable manner about the axis A—B and is formed with a cylinder 10 the axis of which is parallel with

2 said axis A—B and passes centrally through the annular space between the discs 5 and 7. A resilient cap 11 closes the end of the cylinder and a skirt 12 of said cap the exterior of the cylinder and is contracted to grip the exterior of the cylinder by a split band-clip 13 and a bolt 14. A piston 15 is disposed within the cylinder and has a sealing ring 16 located in its periphery and its one face abuts against the resilient cap. A piston 17 is also disposed within the cylinder and has a sealing ring 18 in its periphery and bosses 19 are formed centrally on the adjacent faces of the two pistons to provide a fluid space around the bosses and between said faces.

The head 20 of a piston rod 21 is housed in a counterbore of the piston 15 and a sealing ring 22 is disposed between said head and the end of said counterbore. The rod has a parallel portion 23 extending from the head and passing through the pistons, and the piston 17 is provided with a further sealing ring 24. Said parallel portion also passes through the plate 9, which is provided with a sealing ring 25, into the bore of a torque-resisting tube 26 which has a flange 27 secured in the plate by bolts 28. The piston rod extends through the tube and its projecting end is screw-threaded at 29 and is engaged by a nut 30. A clock-type spring 37 is concentrically arranged around the nut and the inner end of said spring is anchored to said nut in any convenient manner while the outer end of said spring is anchored to a pin 31 secured in a backing plate 32 which locates the nut 30 and which is supported by the tube 26 in a non-rotatable manner, e. g. by flats (not shown) on the periphery of said tube 26. A friction element 33 is mounted on the tube 26 and is disposed between the discs 5, 7 and the backing plate 32 and a friction element 34 is also mounted on the tube 26 and is disposed between the stationary plate 9 and said discs 5, 7.

A passage 35 is provided in the stationary part to convey fluid to the cylinder between the pistons, and a passage 36 is provided to convey fluid to the cylinder on the side of the piston 17 remote from the piston 15.

In operation fluid can be introduced to the cylinder between the pistons to move the piston 15 and piston rod 21 against the action of the resilient cap 11 or fluid can be introduced to the cylinder between the piston 17 and the end of the cylinder to move said pistons and piston rod against the action of said resilient cap.

When wear of the friction elements occurs the clock-type spring 37 automatically rotates the nut 30 to take up said wear and maintain said elements in light frictional engagement with the discs and these means for taking up the wear are as described in British Patent application No. 26,953/46.

Referring to Fig. 2 the piston 17 abuts against a shoulder 38 formed on the piston rod 21 for transmitting movement from said piston to the rod and vice versa.

Referring to Fig. 3 the one end of the cylinder 18 is closed by an end plate 39 secured by any convenient means (not shown) to said cylinder. The head 20 of the piston rod 21 is urged by a compression spring 40 into contact with the piston 17. When fluid is admitted to the cylinder by either of the passages 35, 41 the piston rod is moved against the action of the spring 40 and acts as a push rod to move the friction element 34 against the disc 42 which bears against a stationary friction element (not shown).

It should be appreciated that only one cylinder and associated parts may be employed on a wheel or alternatively a plurality of cylinders and associated parts may be employed and in which latter case said cylinders are equispaced around the axis of the wheel and the stationary plate is preferably of arm or spider formation.

Having described my invention, what I claim is:

1. A fluid-operated disc brake comprising a rotatable axially displaceable friction disc, friction pads located adjacent to and on opposite sides of said disc, a brake-operating cylinder, two pistons contained therein, a piston rod connected to one piston but not connected to the other piston, said rod being operatively associated with said discs and pads, and two systems of fluid supply for the application of braking pressure, the port for one fluid supply being at one extremity of the cylinder and the port for the other fluid supply being intermediate the two pistons whereby one fluid supply moves both pistons in one direction to apply braking pressure and the other fluid supply moves only one piston in the same direction to apply braking pressure.

2. A fluid-operated disc brake in accordance with claim 1 wherein the port for one fluid supply is in the extremity of the cylinder adjacent the pads, and the piston rod is connected to the piston remote from said pads, the unconnected piston being a sliding fit on said rod, whereby the piston rod is movable in tension by either of the fluid supplies to apply braking pressure.

3. A fluid-operated disc brake in accordance with claim 1 wherein the port for one fluid supply is in the extremity of the cylinder remote from the pads and the piston rod is connected to the piston adjacent said discs, whereby the piston rod is movable in compression by either of the fluid supplies to apply braking pressure.

4. A fluid-operated disc brake comprising a pair of concentric and axially displaceable friction discs spaced radially apart, friction pads located adjacent to and on opposite sides of said discs, a brake-operating cylinder, two pistons contained therein, a piston rod connected to one piston but not connected to the other piston, said rod passing between the discs and being operatively associated with said discs and pads, and two systems of fluid supply for the application of braking pressure, the port for one fluid supply being at one extremity of the cylinder and the port for the other fluid supply being intermediate the two pistons whereby one fluid supply moves both pistons in one direction to apply braking pressure and the other fluid supply moves only one piston in the same direction to apply braking pressure.

5. A fluid-operated disc brake in accordance with claim 4 wherein the port for one fluid supply is in the extremity of the cylinder adjacent the pads and the piston rod passes between the discs and is connected to the piston remote from said pads, the unconnected piston being a sliding fit on said rod, whereby the piston rod is movable in tension by either of the fluid supplies to apply braking pressure.

6. A fluid-operated disc brake in accordance with claim 4 wherein the port for one fluid supply is in the extremity of the cylinder remote from the pads and the piston rod is connected to the piston adjacent said discs, whereby the piston rod is movable in compression by either of the fluid supplies to apply braking pressure.

7. A fluid operated means for dual control disc brakes comprising a brake operating cylinder, a brake operating piston in said cylinder, a second piston in said cylinder relatively movable to or from said brake operating piston, said cylinder having a pair of independent fluid passages delivering on opposite sides of and separated by said second piston.

8. The means of claim 7 comprises a resilient element acting against said brake operating piston in a direction opposed to the fluid pressure in said cylinder.

HENRY JAMES BUTLER.

REFERENCES CITED

The following references are of record in the file of this patent:

UNITED STATES PATENTS

| Number | Name | Date |
|---|---|---|
| 854,720 | Dawson | May 28, 1907 |
| 1,630,178 | Harrington | May 24, 1927 |
| 1,875,095 | Milan | Aug. 30, 1932 |
| 2,366,093 | Forbes | Dec. 26, 1944 |
| 2,376,685 | Goepfrich | May 22, 1945 |